United States Patent
Cheng et al.

(10) Patent No.: US 10,975,284 B2
(45) Date of Patent: Apr. 13, 2021

(54) WELL CEMENTATION WORKING SOLUTION PREPARED FROM RED MUD, SLAG AND WASTE DRILLING FLUIDS

(71) Applicant: SouthWest Petroleum University, Chengdu (CN)

(72) Inventors: Xiaowei Cheng, Chengdu (CN); Dan Long, Chengdu (CN); Kaiyuan Mei, Chengdu (CN); Kaiqiang Liu, Chengdu (CN); Gaoyin Zhang, Chengdu (CN); Dan Qin, Chengdu (CN); Xianshu Gao, Chengdu (CN); Jianzhou Jin, Chengdu (CN); Zhaijun Wen, Chengdu (CN); Yongjin Yu, Chengdu (CN); Chunmei Zhang, Chengdu (CN); Zaoyuan Li, Chengdu (CN); Xingguo Zhang, Chengdu (CN); Xiaoyang Guo, Chengdu (CN)

(73) Assignees: SouthWest Petroleum University, Chengdu (CN); China Academy of Building Research, Beijing (CN); CNPC Engineering Technology R&D Company Limited, Beijing (CN)

(*) Notice: Subject to any disclaimer, the term of this patent is extended or adjusted under 35 U.S.C. 154(b) by 0 days.

(21) Appl. No.: 16/495,391

(22) PCT Filed: Jul. 13, 2018

(86) PCT No.: PCT/CN2018/095587
§ 371 (c)(1),
(2) Date: Sep. 19, 2019

(87) PCT Pub. No.: WO2019/153646
PCT Pub. Date: Aug. 15, 2019

(65) Prior Publication Data
US 2020/0071594 A1    Mar. 5, 2020

(30) Foreign Application Priority Data
Feb. 6, 2018   (CN) .......................... 201810118222.1

(51) Int. Cl.
| C09K 8/467 | (2006.01) |
| C04B 14/04 | (2006.01) |
| C04B 14/10 | (2006.01) |
| C04B 18/04 | (2006.01) |
| C04B 22/10 | (2006.01) |
| C04B 24/06 | (2006.01) |
| C04B 24/18 | (2006.01) |
| C04B 24/38 | (2006.01) |
| C04B 28/08 | (2006.01) |
| E21B 33/138 | (2006.01) |
| C04B 103/00 | (2006.01) |

(52) U.S. Cl.
CPC ............ *C09K 8/467* (2013.01); *C04B 14/045* (2013.01); *C04B 14/104* (2013.01); *C04B 18/0409* (2013.01); *C04B 18/049* (2013.01); *C04B 22/10* (2013.01); *C04B 24/06* (2013.01); *C04B 24/18* (2013.01); *C04B 24/383* (2013.01); *C04B 28/08* (2013.01); *C04B 28/085* (2013.01); *E21B 33/138* (2013.01); *C04B 2103/0099* (2013.01)

(58) Field of Classification Search
CPC ...................................................... C09K 8/467
See application file for complete search history.

(56) References Cited

U.S. PATENT DOCUMENTS

| 2017/0306211 A1* | 10/2017 | Pisklak | ................... C04B 28/04 |
| 2017/0369762 A1* | 12/2017 | Martinez | ............... C04B 24/003 |

FOREIGN PATENT DOCUMENTS

| CN | 101037592 A | 9/2007 |
| CN | 102660240 A | 9/2012 |
| CN | 104028538 A | 9/2014 |
| CN | 104508159 A | 4/2015 |
| CN | 105925254 A | 9/2016 |
| CN | 106007655 A | 10/2016 |
| CN | 106623356 A | 5/2017 |
| JP | S5725382 A | 2/1982 |

OTHER PUBLICATIONS

Cheng et al. CN 105925254; Machine Translation (2016).*

* cited by examiner

*Primary Examiner* — Angela M DiTrani Leff
*Assistant Examiner* — Avi T Skaist
(74) *Attorney, Agent, or Firm* — Bayramoglu Law Offices LLC

(57) ABSTRACT

A well cementation working solution prepared from red mud, slag and waste drilling fluids. The working solution is prepared from the following components in parts by weight: 100 parts of waste drilling fluids, 50-100 parts of slag, 5-50 parts of red mud, 4-7 parts of a suspension stabilizer, 1-7 parts of an activating aid, 0.5-5 parts of an anti-pollution agent and 0.4-3.5 parts of a diluent. The waste drilling fluids are waste waterborne drilling fluids. The slag is blast furnace slag or vanadium-titanium slag. The suspension stabilizer is sodium bentonite, carboxymethyl cellulose or a mixture of sodium bentonite and carboxymethyl cellulose. The activating aid is sodium metasilicate nonahydrate, sodium carbonate or a mixture of sodium metasilicate nonahydrate and sodium carbonate. The anti-pollution agent is sodium salicylate, potassium citrate or a mixture of sodium salicylate and potassium citrate. The diluent is sodium lignin sulfonate.

14 Claims, No Drawings

WELL CEMENTATION WORKING SOLUTION PREPARED FROM RED MUD, SLAG AND WASTE DRILLING FLUIDS

CROSS REFERENCE TO THE RELATED APPLICATIONS

This application is the national phase entry of International Application No. PCT/CN2018/095587, filed on Jul. 13, 2018, which is based upon and claims priority to Chinese Patent Application No. 201810118222.1, filed on Feb. 6, 2018, the entire contents of which are incorporated herein by reference.

TECHNICAL FIELD

The present invention relates to a well cementation working solution prepared from industrial wastes (red mud, slag and waste drilling fluids), which belongs to the field of recycling of industrial wastes and in particular applicable to well cementation operations of oil and gas wells.

BACKGROUND

As an intermediate product of a process of extracting alumina in the aluminum industry, red mud has the characteristics of high alkalinity, high pollution and the like. In industrial production, 1-2 tons of red mud is produced in average for every ton of alumina produced. Due to the difficulty in recycling, red mud can only be stacked. As the world's fourth largest alumina producer, China's accumulated accumulation of red mud has exceeded 250 million tons (referring to data in 2013), occupying a large amount of land resources and causing serious pollutions to groundwater and air. In addition, the total storage capacity of slag in China has exceeded 400 million tons, occupying an area of over 60,000 mu (referring to data in 2012). These smelting wastes in open storage occupy the land, contaminate and poison the soil, water and atmosphere, and seriously affect the ecological environment. As the main solid waste of the black metallurgical industry, how to properly use the slag has become an ecological problem that needs to be solved urgently.

Up to now, researchers have conducted extensive researches on the recycling of the above two industrial wastes. In "Acid Treatment Method of Red Mud" (201280074789.4), "Acidified Red Mud" (201410237838.2), acid is respectively used to treat red mud, and the pH of red mud is reduced to be neutral, to eliminate hazards caused by high alkalinity". In "Red Mud Recycling Method" (201611038639.4), red mud blended with a large amount of sodium hydroxide is molten by heating, and then fine iron ore and heat-insulating flame retardant materials are obtained through a series of processes. In "Red Mud Product" (201610378806.3), red mud is mixed with plastic materials to obtain a red mud product through a series of chemical and physical treatment processes.

Through surveys, it is found that the current red mud recycling technology is mostly aimed at reducing the pollution of red mud or extracting iron from the red mud. The industrial production processes of these technologies are complicated, and treatment agents (such as concentrated sulfuric acid and sodium hydroxide) used therein are often harmful to the environment, accompanied with low utilization rate of red mud and lower consumption of red mud, and the complete recycling of red mud cannot be achieved. At the same time, There are similar problems for people in the use of slag. The current mainstream treatment methods use slag to prepare slag cement. The amount of slag consumed in such methods is limited, and the environmental pollution caused by large-scale slag stacking cannot be solved.

With the development of the economy, China's demand for oil and gas resources and its mining volume are increasing. The waste drilling fluids generated during the drilling of oil and gas wells are increasing year by year, and the resulting environmental problems are becoming more and more serious. At present, a well cementation working solution is an indispensable material in the field of well cementation of oil and gas wells, is mostly based on cement slurry and has the characteristics of large usage, disposable sealing and the like. If a novel well cementation working solution system is synthesized by using the slag instead of cement, red mud instead of an activator (by use of its high alkalinity), and drilling fluid partially replacing water, recycling of mud, slag and waste drilling fluid can be realized, and meanwhile the environmental pollution problem caused by the massive accumulation of red mud and slag can be solved.

SUMMARY

The present invention provides the following technical solution.

A well cementation working solution prepared from red mud, slag and waste drilling fluids consists of the following components in parts by weight:

100 parts of waste drilling fluids;
50-100 parts of slag;
5-50 parts of red mud;
4-7 parts of a suspension stabilizer;
1-7 parts of an activating aid;
0.5-5 parts of an anti-pollution agent;
0.4-3.5 parts of a diluent.

The waste drilling fluids are waste waterborne drilling fluids that include a waterborne drilling fluid suitable for high temperature and high pressure drilling and a waterborne drilling fluid having a density ranging from 1.10 to 2.05 $g/cm^3$.

The slag is blast furnace slag (GB/T18046-2008) or vanadium-titanium ore slag, wherein the blast furnace slag is S105 pulverized and water quenched blast furnace slag, and the vanadium-titanium slag has a particle diameter of 10-50 μm.

The red mud is a non-dealkalized Bayer red mud and does not need to be specially treated before use.

The suspension stabilizer may be sodium bentonite, carboxymethyl cellulose or a mixture of sodium bentonite and carboxymethyl cellulose.

The activating aid may be sodium metasilicate nonahydrate, sodium carbonate or a mixture of sodium metasilicate nonahydrate and sodium carbonate.

The anti-pollution agent may be sodium salicylate, potassium citrate or a mixture of sodium salicylate and potassium citrate.

The diluent which may be sodium lignosulfonate.

A curing agent used in the present invention, i.e., slag, is an environmentally friendly geopolymer, which belongs to industrial waste and has certain activity and curing ability, but requires a highly alkaline environment in actual use (sodium hydroxide or potassium hydroxide is often used as an activator) to excite its activity, thereby forming a gelled structure for curing purposes. In the present invention, taking full advantage of the high alkalinity of red mud, the use of red mud instead of the traditional activator enables the activation of the curing agent. In order to further ensure the strength of a cementitious structure formed by the well cementation working solution, the activating aid is used to increase the activity of the curing agent, and the addition of the activating aid and the diluent destroys the polymer components in the waste drilling fluids. The microscopic structure of the abandoned drilling fluid is changed, the replacement of the waste drilling fluids with water is realized, and the recycling of the waste drilling fluids is also realized. The addition of the anti-pollution agent in the slurry not only eliminates the negative effects of the waste drilling fluids and red mud on the curing ability of the curing agent, but also improves the rheology and sedimentation stability of the working solution, so that the working solution has better pumpability.

Compared with the prior art, the present invention has the following beneficial effects:

(1) an objective of the present invention is to provide a well cementation working solution prepared from red mud, slag and waste drilling fluids. This system has good sedimentation stability, pumpability and sealing ability, the compressive strength of the cured slurry is relatively large and the cementing cost is extremely low. The present invention overcomes the deficiencies of the existing red mud utilization method, realizes the recycling of the slag and the waste drilling fluids, provides a new research idea for the harmless treatment of the industrial solid wastes and the liquid wastes, and has broad market prospects.

(2) the well cementation working solution makes full use of the characteristics of high alkalinity of the red mud, successfully introduces and seals the red mud, realizes the recycling of the red mud, and effectively solves the environmental pollution caused by red mud stacking. In addition, the red mud used in the working solution does not need to be pre-treated, and has the characteristics of simple process and environmental friendliness;

(3) the cell cementation working solution makes successful use of the waste drilling fluids instead of water, and the slag instead of cement to realize the recycling of the waste resources, and to some extent solve the environmental pollution problem caused by the discharge of the waste drilling fluids and the stacking of the slag;

(4) the well cementation working solution is mainly composed of waste drilling fluids and slag, and has the advantages of wide sources and low cost;

(5) the well cementation working solution has the characteristics of low density and high thixotropy, and has good anti-leakage and plugging functions for well cementation of oil and gas wells in low-abundance and low-pressure and easy-leakage blocks. This is the advantage that the ordinary low-density cement slurry system does not have. The filling effect on ultra-long open hole sections of the oil and gas wells can also meet the basic requirements of low-density set cement.

From the above, the well cementation working solution of the present invention is reliable in principle and low in cost. Different industrial wastes (red mud, slag and waste drilling fluids) are sufficiently considered and utilized. Recycling of multiple industrial wastes is achieved, accompanied with the characteristics of resource saving and environmental friendliness. In addition, the well cementation working solution is simple in preparation process, convenient in use on site and particularly applicable to well cementation of oil and gas wells in low-abundance, low-pressure and easy-to-leak blocks, and good technical support can be provided for development of oil and gas resources of the blocks.

DETAILED DESCRIPTION OF THE EMBODIMENTS

I. Preparation of Well Cementation Working Solution Prepared from Red Mud, Slag and Waste Drilling Fluids The present invention will now be described in detail in connection with specific embodiments.

Embodiment 1

Formula: 100 parts of waste drilling fluids (1.12 $g/cm^3$), 90 parts of finely-ground and water-quenched blast furnace slag, 10 parts of red mud, 5 parts of sodium bentonite, 6 parts of sodium metasilicate nonahydrate, 1 part of sodium salicylate, and 0.5 part of sodium lignosulfonate.

Embodiment 2

Formula: 100 parts of waste drilling fluids (1.12 $g/cm^3$), 80 parts of finely-ground and water-quenched blast furnace slag, 20 parts of red mud, 5.5 parts of carboxymethyl cellulose, 5.5 parts of sodium carbonate, 1.5 parts of potassium citrate, and 0.8 part of sodium lignosulfonate.

Embodiment 3

Formula: 100 parts of waste drilling fluids (1.12 $g/cm^3$), 70 parts of finely-ground and water-quenched blast furnace slag, 30 parts of red mud, 5 parts of carboxymethyl cellulose, 2 parts of sodium metasilicate nonahydrate, 3.8 parts of sodium carbonate, 0.8 part of sodium salicylate, 1 part of potassium citrate and 1.2 parts of sodium lignosulfonate.

Embodiment 4

Formula: 100 parts of waste drilling fluids (1.12 $g/cm^3$), 90 parts of vanadium-titanium slag, 10 parts of red mud, 5 parts of sodium bentonite, 5 parts of sodium metasilicate nonahydrate, 0.8 part of sodium salicylate, and 0.9 part of sodium lignosulfonate.

Embodiment 5

Formula: 100 parts of waste drilling fluids (1.12 $g/cm^3$), 80 parts of vanadium-titanium slag, 20 parts of red mud, 5.5 parts of carboxymethyl cellulose, 5.5 parts of sodium metasilicate nonahydrate, 1 part of sodium salicylate, 0.6 part of potassium citrate, and 0.5 part of sodium lignosulfonate.

Ii. Performance Testing of Well Cementation Working Solution Prepared from Red Mud, Slag and Waste Drilling Fluids In Embodiment 1, Embodiment 2, Embodiment 3, Embodiment 4, and Embodiment 5, cured slurry is respectively prepared according to the national standard GB/T19139-2012, and basic performances, such as the density, fluidity and thickening time of this cured slurry system are measured. The slurry is poured into a grinding apparatus, and after curing under standard conditions for different periods (3 days, 7 days, 14 days, and 28 days), the compressive strength of the cured slurry and the ion content in leachate are measured (referring to standard HJ/T299-2007).

The engineering performance results of the well cementation working solution prepared from red mud, slag and waste drilling fluids are shown in Table 1. The compressive strength evaluation results of the cured slurry samples under standard conditions in different periods and the ion content of leachate are shown in Table 2 and Table 3 respectively.

TABLE 1

Engineering Performance of Well Cementation Working Solution Prepared from Red Mud, Slag and Waste Drilling Fluids

| Embodiment | Density (g/cm³) | Flow (cm) | Filter loss (ml) | Thickening time (min) |
|---|---|---|---|---|
| 1 | 1.52 | 23 | 66 | 290 |
| 2 | 1.64 | 20.5 | 56 | 328 |
| 3 | 1.49 | 19 | 44 | 390 |
| 4 | 1.54 | 22.5 | 60 | 270 |
| 5 | 1.66 | 21 | 49 | 311 |

The test evaluation results in Table 1 show that the present invention has good engineering performance and can well meet the requirements of on-site well cementation construction.

TABLE 2

Compressive Strength of Well Cementation Working Solution Prepared from Red Mud, Slag and Waste Drilling Fluids

| Embodiment | Curing temperature (° C.) | Compressive Strength (MPa) | | | |
|---|---|---|---|---|---|
| | | 3 days | 7 days | 14 days | 28 days |
| 1 | 25 | 4.16 | 7.16 | 9.88 | 11.53 |
| 2 | 25 | 3.77 | 6.58 | 9.12 | 10.04 |
| 3 | 25 | 3.14 | 5.89 | 8.86 | 9.00 |
| 4 | 25 | 4.28 | 7.56 | 10.14 | 12.18 |
| 5 | 25 | 4.00 | 7.12 | 9.43 | 10.62 |

By analyzing the compressive strength test results in different embodiments after curing under standard conditions for different periods (as shown in Table 2), it can be seen that for the same embodiment, as the curing period increases, the compressive strength after the curing of the slurry is increasing continuously. Although the addition of red mud has certain damage to the compressive strength of the well cementation working solution, the overall strength is still relatively high, which can meet the strength requirements for a filling section in the field well cementation operation.

TABLE 3

Heavy Metal Leaching Concentration of Well Cementation Working Solution Prepared from Red Mud, Slag and Waste Drilling Fluids

| Embodiment | Category | Heavy Ion Concentration (mg/L) | | | |
|---|---|---|---|---|---|
| | | 3 days | 7 days | 14 days | 28 days |
| 1 | As | 0.23 | 0.17 | 0.12 | 0.10 |
| | Pb | 0.02 | 0.01 | 0.01 | ≤0.01 |
| | Zn | 0.12 | 0.07 | 0.05 | 0.04 |
| 2 | As | 0.25 | 0.18 | 0.14 | 0.11 |
| | Pb | 0.03 | 0.02 | 0.01 | ≤0.01 |
| | Zn | 0.13 | 0.09 | 0.07 | 0.06 |
| 3 | As | 0.25 | 0.19 | 0.14 | 0.12 |
| | Pb | 0.03 | 0.02 | 0.01 | 0.01 |
| | Zn | 0.13 | 0.10 | 0.08 | 0.07 |
| 4 | As | 0.20 | 0.12 | 0.07 | 0.06 |
| | Pb | 0.02 | ≤0.01 | ≤0.01 | ≤0.01 |
| | Zn | 0.11 | 0.06 | 0.04 | 0.04 |
| 5 | As | 0.22 | 0.13 | 0.08 | 0.07 |
| | Pb | 0.02 | 0.01 | ≤0.01 | ≤0.01 |
| | Zn | 0.12 | 0.08 | 0.06 | 0.06 |

Note:
≤refers to testing limit

By analyzing the heavy metal leaching concentration in Table 3, it is known that as the curing period increases, the heavy metal contents of As, Pb, and Zn leached in the sample gradually decrease, thereby indicating that the cured working solution has good sealing ability for heavy metals such as As, Pb and Zn contained in red mud.

From the above, the present invention meets the performance requirements of ordinary well cementation working solutions, and has lower cost and better economical applicability than the conventional cured fluid system of cement slurry. The working solution system consumes a huge amount of industrial wastes (slag, red mud and waste drilling fluids) by replacing cement with slag, replacing an activator with red mud and partially replacing water with drilling fluid, thereby greatly reducing the environmental pollution caused by the stacking (or discharge) of industrial wastes, and providing a new idea for the recycling of industrial wastes. Meanwhile, the working solution preparation process is the same as the traditional well cementation construction process, and is simple in operation and has good engineering applicability.

What is claimed is:

1. A well cementation working solution, comprising the following components in parts by weight:
   100 parts of waste drilling fluids;
   50-100 parts of a slag;
   5-50 parts of an alkaline activator, wherein the alkaline activator consists of a non-dealkalized Bayer red mud;
   4-7 parts of a suspension stabilizer;
   1-7 parts of an activating aid;
   0.5-5 parts of an anti-pollution agent; and
   0.4-3.5 parts of a diluent;
   wherein the well cementation working solution does not comprise sodium hydroxide and potassium hydroxide.

2. The well cementation working solution of claim 1, wherein the waste drilling fluids are waste waterborne drilling fluids and the waste waterborne drilling fluids comprise a waterborne drilling fluid suitable for high temperature and high pressure drilling, wherein, the waterborne drilling fluid has a density ranging from 1.10 g/cm³ to 2.05 g/cm³.

3. The well cementation working solution of claim 1, wherein the slag is a blast furnace slag or a vanadium-titanium ore slag, the blast furnace slag is a S105 pulverized and water quenched blast furnace slag, and the vanadium-titanium slag has a particle diameter of 10-50 μm.

4. The well cementation working solution of claim 1, wherein the suspension stabilizer is one item selected from the group consisting of sodium bentonite, carboxymethyl cellulose or a mixture of sodium bentonite and carboxymethyl cellulose.

5. The well cementation working solution of claim 1, wherein the activating aid is one item selected from the group consisting of sodium metasilicate nonahydrate, sodium carbonate or a mixture of sodium metasilicate nonahydrate and sodium carbonate.

6. The well cementation working solution of claim 1, wherein the anti-pollution agent is one item selected from the group consisting of sodium salicylate, potassium citrate or a mixture of sodium salicylate and potassium citrate.

7. The well cementation working solution of claim 1, wherein the diluent is sodium lignosulfonate.

8. A method for using the well cementation working solution of claim 1, comprising the step of applying the well cementation working solution to a well cementation of oil and gas wells.

9. The method according to claim 8, wherein the waste drilling fluids are waste waterborne drilling fluids, and the waste waterborne drilling fluids comprises a waterborne drilling fluid suitable for high temperature and high pressure drilling, wherein, the waterborne drilling fluid has a density ranging from 1.10 $g/cm^3$ to 2.05 $g/cm^3$.

10. The method according to claim 8, wherein the slag is a blast furnace slag or a vanadium-titanium ore slag, the blast furnace slag is a S105 pulverized and water quenched blast furnace slag, and the vanadium-titanium slag has a particle diameter of 10-50 μm.

11. The method according to claim 8, wherein the suspension stabilizer is one item selected from the group consisting of sodium bentonite, carboxymethyl cellulose or a mixture of sodium bentonite and carboxymethyl cellulose.

12. The method according to claim 8, wherein the activating aid is one item selected from the group consisting of sodium metasilicate nonahydrate, sodium carbonate or a mixture of sodium metasilicate nonahydrate and sodium carbonate.

13. The method according to claim 8, wherein the anti-pollution agent is one item selected from the group consisting of sodium salicylate, potassium citrate or a mixture of sodium salicylate and potassium citrate.

14. The method according to claim 8, wherein the diluent is sodium lignosulfonate.

* * * * *